United States Patent [19]
Buss

[11] 3,992,614
[45] Nov. 16, 1976

[54] SAW POSITIONING SYSTEM FOR SAWMILL EDGER

[75] Inventor: Jack Buss, Federal Way, Wash.

[73] Assignee: Pre-Con, Inc., Mercer Island, Wash.

[22] Filed: Nov. 29, 1974

[21] Appl. No.: 528,560

[52] U.S. Cl. .......................... 235/151.1; 83/425.4; 83/499; 340/172.5; 318/685; 318/601
[51] Int. Cl.² .................................................. B26D 7/26
[58] Field of Search ....... 235/92 MP, 92 DN, 151.1; 83/508.3, 499, 425.4, 504; 318/608; 91/375 R

[56] References Cited
UNITED STATES PATENTS

| | | | |
|---|---|---|---|
| 2,434,668 | 1/1948 | May | 91/375 |
| 2,961,015 | 11/1960 | Randall | 83/508.3 |
| 2,992,661 | 7/1961 | Burelbach | 83/508.3 |
| 3,139,570 | 6/1964 | Jacobson et al. | 235/92 MP |
| 3,448,360 | 6/1969 | Pohl | 318/601 |
| 3,728,607 | 4/1973 | Isak | 318/608 |

*Primary Examiner*—Eugene G. Botz
*Attorney, Agent, or Firm*—Seed, Berry, Vernon & Baynham

[57] ABSTRACT

A system for controlling the spacing between a plurality of saw blades. Precise control is insured by cascading an electrical feedback system in series with a mechanical feedback system.

The electrical feedback system includes a position register for recording the actual location of each saw blade, a command register for recording the desired position of each saw blade, a comparator for generating an error signal corresponding to the difference between the actual and desired saw positions, and a stepper motor responsive to the error signal. The stepper motor drives a control shaft having a shaft encoder secured thereto which feeds pulses back to increment or decrement the position register, thereby synchronizing the contents of the position register to the actual position of the stepper motor.

The mechanical feedback system includes a hydraulic cylinder for controlling the position of the saw, a feedback shaft having an angular position determined by the position of the saw, and a hydraulic servo valve which actuates the hydraulic cylinder in either direction, depending on the relative position between the feedback shaft and the control shaft.

4 Claims, 12 Drawing Figures

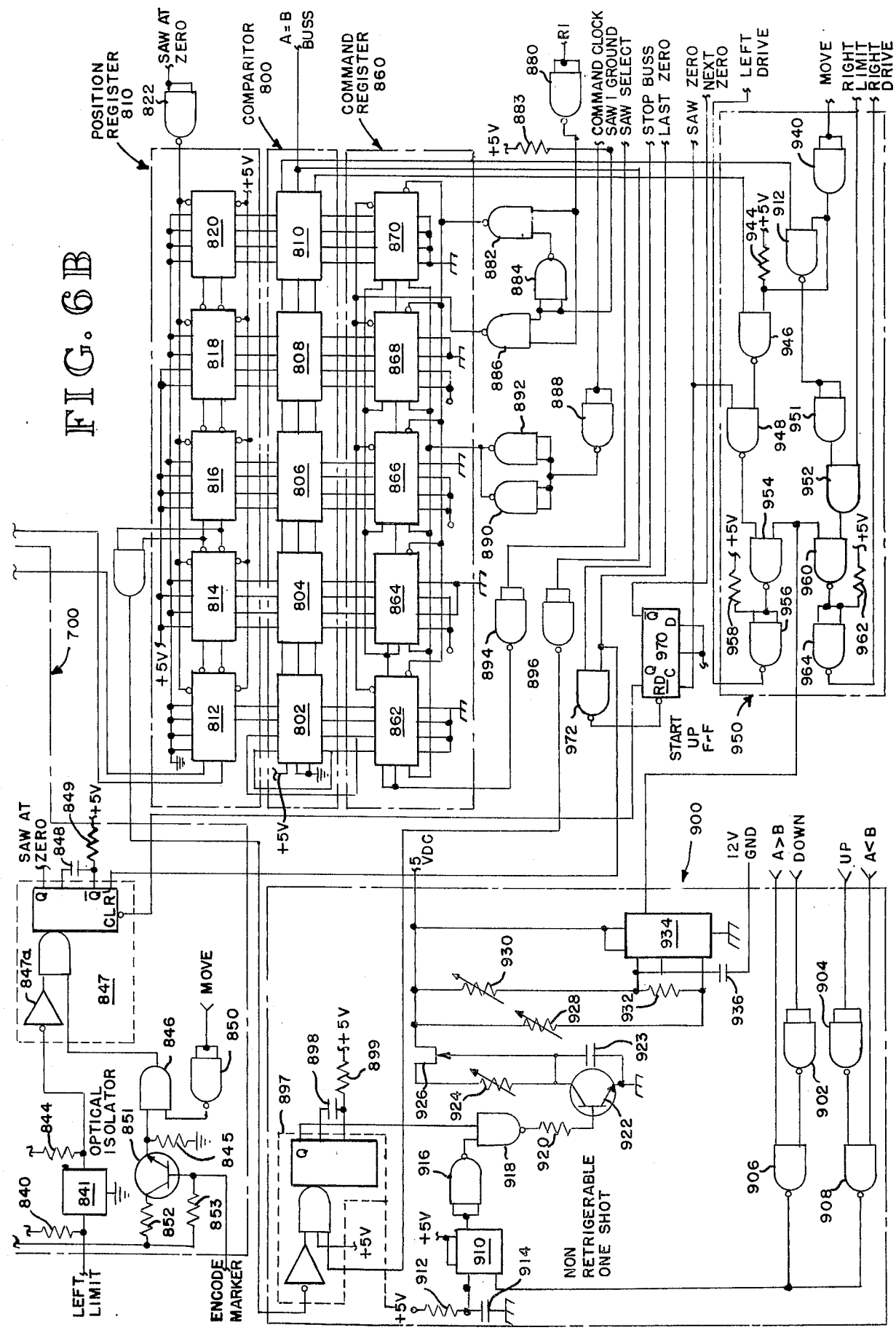

SAW POSITIONING SYSTEM FOR SAWMILL EDGER

BACKGROUND OF THE INVENTION

1. Field of the Invention

This invention relates to systems for positioning saws in a sawmill and, more particularly, to saw positioning system utilizing digital feedback techniques to accurately measure the saw position and compare it to a precisely selected, desired position to produce a corrective saw positioning signal.

2. Description of the Prior Art

In the art of transforming logs into usable lumber, logs are first sawed into large rectangular boards called cants. The cants are then sent to an edger to be trimmed of waste wood and cut into a plurality of boards. The edger usually comprises a number of saw blades rotating on a common shaft. Means are provided for adjusting the position of each saw to obtain boards of any desired width. A serious disadvantage of prior art edgers results from the fact that the saw blades are not independently adjustable. That is, to vary the width of a board, the position of one saw blade is adjusted. In doing so, the width of the neighboring board is also, of necessity, modified. Using prior art edgers, the sawmill operator initially selects the desired board sizes. The operator will usually find either that the combination of board sizes selected is too wide for the cant or that the combination is too narrow, thereby leaving waste wood at the edge of the cant which is not commercially usable. The operator will then modify the combination of board sizes in an attempt to reduce the quantity of wasted wood. Using prior art edgers, this is a very time-consuming task since each saw must be independently adjusted. The usual practice in sidewalls is to attempt a compromise between wasting an excess amount of wood and wasting an excess amount of time. However, with the increasing scarcity of wood and the increasing cost of labor, both alternatives of this compromise have become unacceptable.

SUMMARY OF THE INVENTION

It is an object of this invention to produce an edger having a plurality of saw blades wherein the spacing between any two adjacent saw blades may be modified without modifying the spacing between any other blades.

It is another object of this invention to provide an edger which is capable of accurately positioning saw blades with great precision.

It is a further object of the present invention to provide an edger which requires relatively little skill to operate.

It is still another object of the present invention to provide an edger in which the combination of intersaw spacings that is selected may be quickly and easily modified.

These and other objects of the present invention are accomplished by providing an edger in which the spacing between any two saw blades can be increased or decreased without modifying the position between any other saw blades. The edger includes aa feedback shaft for each saw having an angular position determined by the position of each saw relative to an adjacent saw. The rotational position of the feedback shaft is compared to the rotational position of a control shaft by a hydraulic servo vlave which controls the operation of a hydraulic actuator to modify the saw position. The control shaft is in turn driven by an electrical feedback system having a command register including means for entering a number corresponding to the desired board width, a position register including means for entering a number corresponding to the angular position of the control shaft, a comparator for comparing the desired control shaft position to the actual control shaft position and for producing an error signal indicative thereof, and a stepper motor responsive to the comparator error signal for driving the control shaft.

Each saw can be independently positioned by a carriage system which, when moving one saw, also moves all saws on one side a corresponding distance to maintain their intersaw spacing.

FIGS. A–5C 5 are schematic and timing diagrams for the matrix board which controls the timing and operation of the other boards and assigns a dimension to each push button on the input console.

FIGS. A–6D 6 are schematic and timing diagrams for one of the comparator boards provided for each saw which generate error signals having values determined by the difference between the actual position of a saw blade and the desired position of a saw blade.

Figure 7:
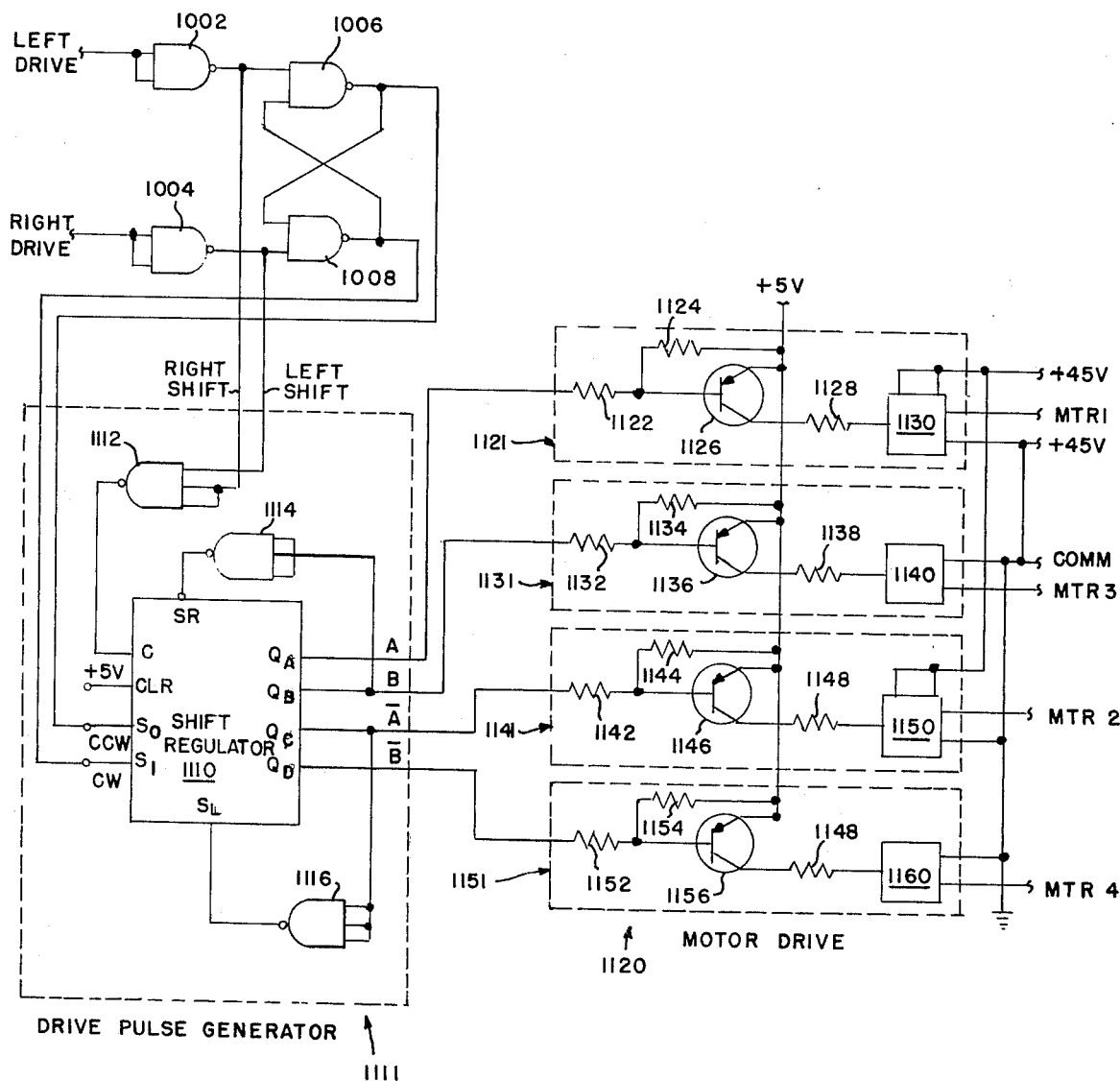

FIG. 7 is a schematic of the motor drive board which generates the desired pulse sequence for driving the stepper motor.

DESCRIPTION OF THE PREFERRED EMBODIMENT

The operation of the saw positioning system of the present invention will now be explained by reference to FIGS. 1 and 2. Referring to FIG. 2, a console 100 is provided for entering data into the system. The console 100 includes two groups of switches for each saw — an adders group 112 and a sets group 114. Since there are five saws in the system, five rows of switches 110, 120, 130, 140 and 150 are provided on the console 100. The basic board width for each saw is established by selecting any one of the sets buttons 114. After a selection is made, a new selection will automatically cancel the previous combination of switches selected on the sets group 114, as well as the adders group 112. Therefore only one switch may be selected from the sets group 114. As will be explained hereinafter, means are provided for illuminating the push button switch that is selected.

Each saw also has an adders group 112 having push button switches which may be selected to add any desired dimension to the board dimension selected by the sets push buttons 114. Unlike the sets push buttons 114, any combination of adder bottoms 112 may be selected at the time. As noted above, a new set selection will automatically cancel the adders selection as well as the set selection.

The console 100 also includes a move switch 160 which actuates the saw positioning system after the operator has established his selections on the console panel 100. Until the move switch 160 is actuated, the positions of the saws do not change. For this reason, the sawmill operator can select dimensions for a subsequent cant during the time that the edger is operating on a previous cant. After the desired combination is selected on the console 100, the operator presses the move button 160 and all of the saws move simultaneously to their selected positions.

The zero push button switch 170 is depressed by the operator immediately after the power has been turned on to establish a zero reference point for the digital measuring system. Upon pressing zero 170, all of the saws will move to their leftmost position and the position registers which keep track of the positions of the saws will be initialized to a number corresponding to the actual position of the saws in their leftmost position.

At any time during the movement of the saws, the stop push button switch 165 can be depressed to interrupt movement until the move switch 160 or zero switch 170 is actuated. This is essentially a safety feature to allow interruption of the saw movement before these saws have reached their selected positions.

The upper left-hand corner of the console 100 includes control power switches 180 for turning on and off the electronic system. Similarly, the upper right-hand corner of the console 100 includes hydraulic power switches 190 which start and stop the hydraulic power unit.

Figure 1:
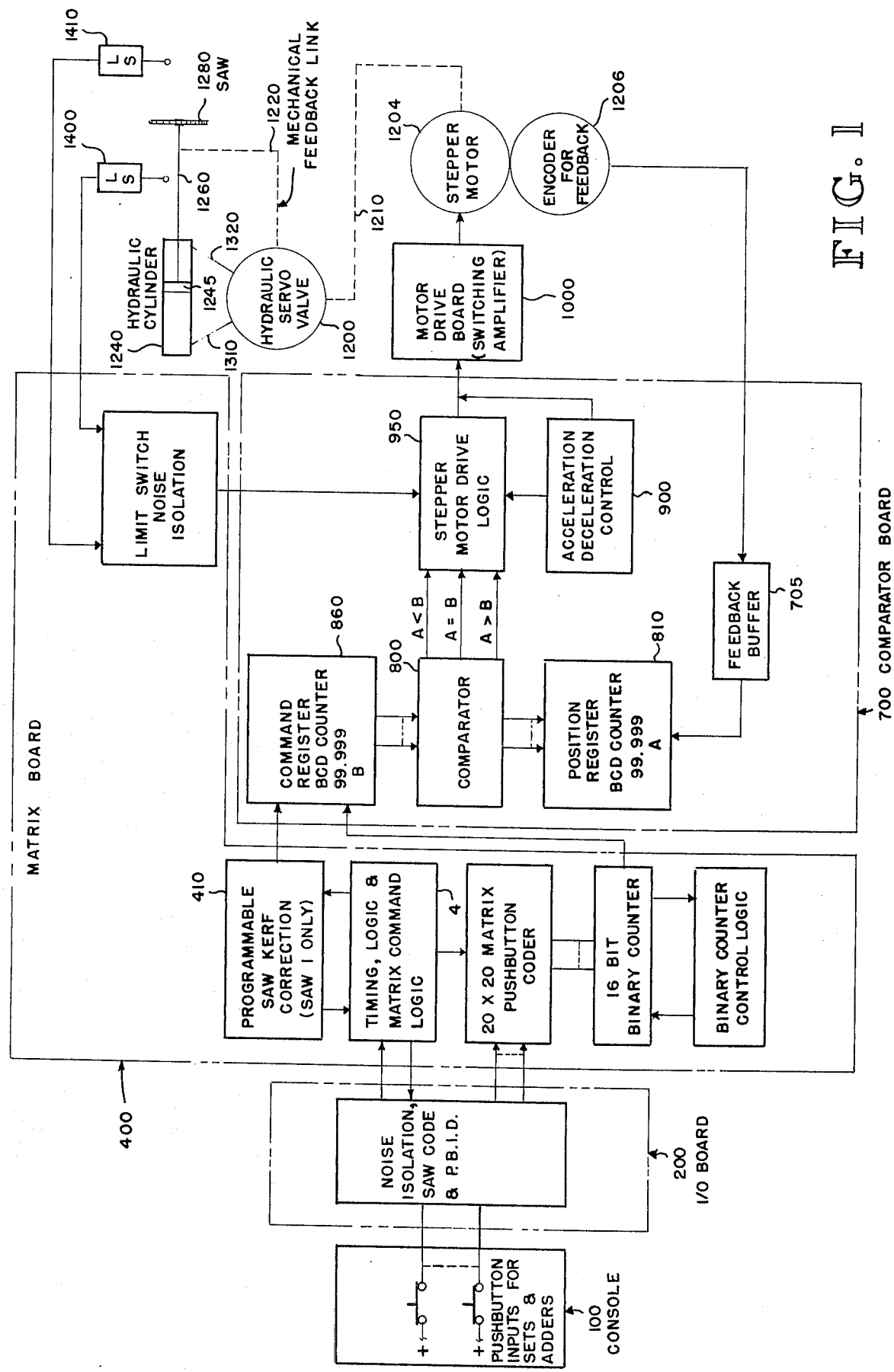
FIG. 1 is a block diagram showing the saw positioning system for the sawmill edger of the present invention.
Figure 2:
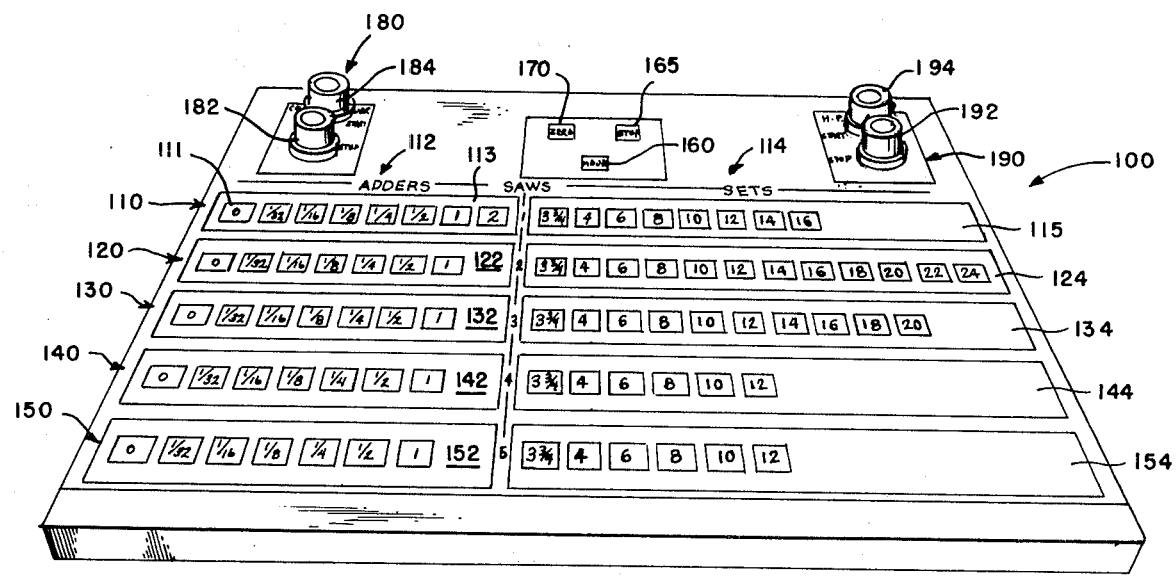
FIG. 2 is an isometric view of the input console for the sawmill edger of the present invention.

Referring now to FIG. 1, an I/O board 200 is provided for each of the five adders groups 113, 122, 132, 142, 152 and each of the five sets groups 115, 124, 134, 144, 154 on the console 100. Since there are five saws and two groups of switches 112 and 114 for each saw, there are a total of ten groups of switches and, therefore, ten I/O boards. However, for simplicity only one I/O board is shown connected to one group of switches in FIG. 1, The I/O board 200 sequentially interrogates each switch in its corresponding switch group to determine which switches have been selected. Means are also provided for illuminating a light within the selected switch and for resetting the selected switch after the switch data has been transmitted to the matrix board 400.

The matrix board 400 serves a variety of separate functions. It sequentially addresses each I/O board 200 to receive the data contained therein. It then assigns a predetermined dimension for each selected switch. This is necessary because the I/O board records only that a given switch has been selected. It does not assign a specific dimension to that switch. The matrix board 400 addresses each of the ten I/O boards in sequence, receives data therefrom indicating which switches in each group have been selected, assigns a predetermined and programmable dimension to each selected switch and, as will hereinafter be explained, transmits a predetermined number of pulses to the command register 860 in the comparator board 700 associated with the saw corresponding to the I/O board being addressed. The matrix board 400 then addresses the next I/O board 200 to transmit the data therefrom until all of the I/O boards have been addressed.

The matrix board 400 also includes a programmable circuit for saw kerf correction 410 which, as will be explained hereinafter, insures proper positioning of the leftmost saw. When the power is turned on in the system, the registers which record the position of each saw blade will be randomly set. Therefore, the operator must first initialize these registers to a value corresponding to a known saw location. The operator performs this function by pressing the zero push button 170 on the console 100, causing all of the saw blades 1280 (FIG. 3) to move to their leftmost positions. Each of the saws 1280 (FIG. 1) is provided with a limit switch 1400 at a known location. When the saws move to their leftmost position, their limit switches are actuated, thereby placing a value corresponding to the location of the limit switch into the position register. At this time, the right edge of the number 1 (leftmost) saw 1280a will be flush with the right edge 1381 of the fence 1380 since the fence 1380 is provided with a recess 1382 into which saw number 1 (1280a) may fit to allow sawing without interference from saw 1 when saw 1 is not to be used. However, the dimension of the first piece of wood will be the distance between the edge 1381 and the left side of the number 1 saw 1280a. Thus it is necessary to add the kerf width to each dimension selected for saw number 1. In other words, if the kerf of saw number 1 is ⅛ inch and the operator selects 1 inch for saw number 1, saw number 1 must move 1⅛ inch to the right so that the distance between the fence edge 1381 and the left side of saw number 1 will be 1 inch. The programmable saw kerf correction 410 is used to add the width of the saw kert for saw number 1 to all dimensions selected for saw number 1.

Although the above discussion describes the system as having a left-hand zero, it will be obvious to one skilled in the art that a right-hand zero would be possible using the same system with slight modifications. Furthermore, the system can be given the capability of selecting between either a lefthand or right-hand zero.

A comparator board 700 is provided for each saw. It includes a command register 810 into which a number corresponding to the desired position for each saw is entered. Similarly, a position register 860 records the initial position of the saw and is incremented or decremented through feedback buffer 705 as the position of the saw changes. Compartor 700 generates an A = B signal if the number in the position register 860 is equal to the number in the command register 810, an A < B signal if the number in the position register is less than the number in the command register, and an A > B signal if the number in the position register is greater than the number in the command register. These signals cause the stepper motor drive logic 950 to generate appropriate signals to rotate the stepper motor 1204 in a direction that will cause the number stored in the position register 860 to equal the number stored in the command register 810.

The stepper motor 1204 drives the control shaft 1210 as well as the shaft encoder 1206. Control shaft 1210 controls the operation of hydraulic servo valve 1200, which is in communication with a source of pressurized hydraulic fluid (not shown). A feedback shaft 1220 rotates according to the position of the saw 1280. The hydraulic servo valve 1200 has two outputs ports communicating through fluid conduits 1310, 1320 with each of two input ports in hydraulic cylinder 1240. The hydraulic servo valve 1200 allows pressurized hydraulic fluid to flow into one end of hydraulic cylinder 1240 when the control shaft 1210 is rotated in one direction a greater distance than feedback shaft 1220. Pressurized hydraulic fluid flows into the other end of hydraulic cylinder 1240 when control shaft 1210 is rotated in the opposite direction farther than feedback control shaft 1220. When control shaft 1210 is in the same relative position as feedback control shaft 1220, no fluid flows through the hydraulic servo valve 1200 and the piston 1245 in the hydraulic cylinder 1240 remains stationary. The saw 1280 is driven by the piston 1245 in the hydraulic cylinder 1240 through arm 1260.

The mechanism for rotating the feedback shaft 1220 according to the position of the saw 1280 may may be a conventional device available from Olson Controls in which the feedback shaft 1220 contains a helical thread which mates with a key on the piston 1245.

13-2
14-1
15-4
16-4
17-2
19-8
20-7
21-4
22-2
23-4
24-3
26-1

27-1
28-1
29-42
30-11
33-2
37-3
38-1
39-4

In operation, the control shaft 1210 rotates an amount determined by the number preset in the command register 810. Assuming that the control shaft 1210 has rotated 20 degrees clockwise, corresponding to a desired 3 inch movement of the saw to the right, hydraulic fluid will flow through conduit 1310 into the left side of hydraulic cylinder 1240 to drive piston 1245 to the right, thereby moving saw 1280 to the right through arm 1260. As the saw 1280 moves to the right, feedback shaft 1220 rotates clockwise until it has rotated a distance of 20 degrees. At this time, the feedback shaft 1200 will be in the same relative position as the control shaft 1210 and the hydraulic servo valve 1200 will cut off flow to the hydraulic cylinder 1240. In this manner, the feedback shaft 1220 accurately rotates in synchronism with the control shaft 1210 to insure that the position of the saw 1280 follows the angular position of the control shaft 1210.

As noted previously, FIG. 1 illustrates the control system of the present invention for one saw only. It is to be emphasized that the console 100 provides input data to ten I/O boards — a sets I/O board and an adder I/O board for each of five saws. Each of the ten I/O boards 200 is sequentially addressed by a signal matrix board 400 which generates a series of pulses to preset the proper command register 810 to a value corresponding to the switches selected on the console for that saw. A comparator board 700 is provided for each saw and, therefore, there are a total of five comparator boards. In summary, the I/O board 200 receives and registers which buttons are selected for each saw. The matrix board 400 sequentially receives the data from the I/O boards, assigns the proper dimension to each selected switch and presets the command register for a particular saw. The matrix board then addresses the sets and adders I/O boards for the next saw and presets the command register for that saw. When all five command registers corresponding to the five saws have been preset, the move button 160 is pressed and all of the saws move simultaneously to their selected positions.

Figure 3:
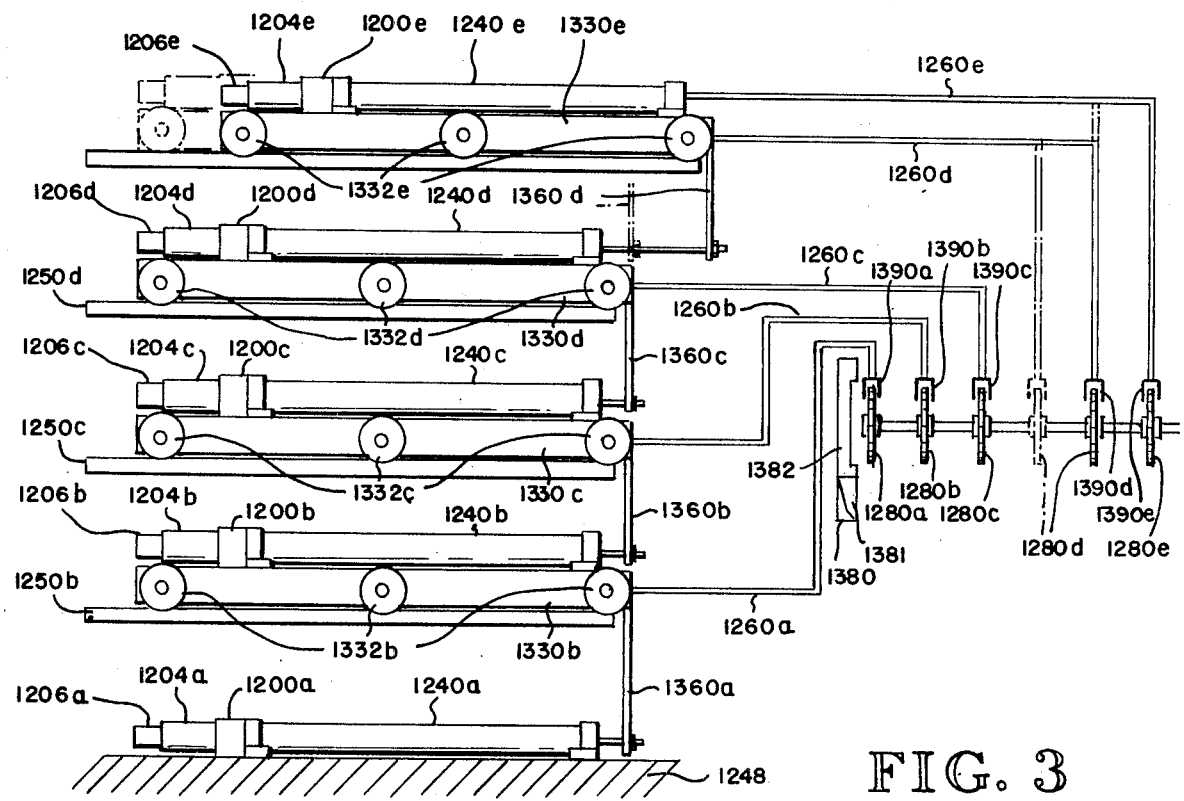
FIG. 3 is a plan view of the mechanical positioning system for the saw blades.

The mechanism for moving the saw blades is shown in FIG. 3. The hydraulic cylinder 1240a for saw number 1 (1280a) is secured to a stationary portion of the edger 1248. Affixed to the hydraulic cylinder 1240a are a hydraulic servo valve 1200a, a stepper motor 1204a and a shaft encoder 1206a. As the stepper motor 1204a drives an internal control shaft 1210 (not shown in FIG. 3), servo valve 1200a allows fluid to flow into the hydraulic cylinder 1240a to drive rod 1360a in the appropriate direction. An internal feedback shaft 1220 (not shown in FIG. 3) is connected to the other side of hydraulic servo valve 1200a and rotates according to the position of the rod 1360a with respect to the stationary portion 1248 of the sawmill. The feedback shaft also drives the shaft encoder 1206a, which produces a predetermined number of pulses for each rotation of the feedback shaft and hence for a predetermined movement of the rod 1360a.

Rod 1360a extends upward to contact carriage 1330b, having secured thereto wheels 1332b which rest on rails 1250b. This arrangement causes the carraige 1330b to move from left to right according to the movement of rod 1360a. Another rod, 1260a, extends from the carriage 1330b to a guide 1390a on saw number 1 (1280a). Saw 1280a is driven by rotating shaft 1350 and is adapted to slide along the axis of rotating shaft 1350. Lateral movement of the carriage 1330b causes the saw 1280a to move axially along the shaft 1350 through arm 1260a and guide 1390a. Guide 1390a is well known in the field and typically comprises a pair of pads which slidably rest against the rotating blade and are held in place by a support which straddles the blade. However, other mechanisms for axially moving saw blades on a rotating shaft are known, and it is to be understood that the present invention is not limited to the precise structure shown.

The positioning mechanism d saws 1280b, 1280c and 1280c function in a manner identical to the mechanism for saw 1280a. Saw 1280e, unlike the other saw mechanism, is driven directly from piston rod 1260e.

It can be seen that the mechanism shown in FIG. 3 allows adjustment of the distance between any two adjacent saws without modifying the distance between any other two saws without modifying the distance between any other two adjacent saws. Thus, if saw 1280a is moved 3 inches to the right, all other saws will be moved a corresponding distance to the right, thereby increasing the width of the wood cut by the first saw, 1280, while maintaining the width of the wood cut by the other saws constant. The mechanism described herein thereby allows quick, easy and independent adjustment of all saw blades.

Figure 4:
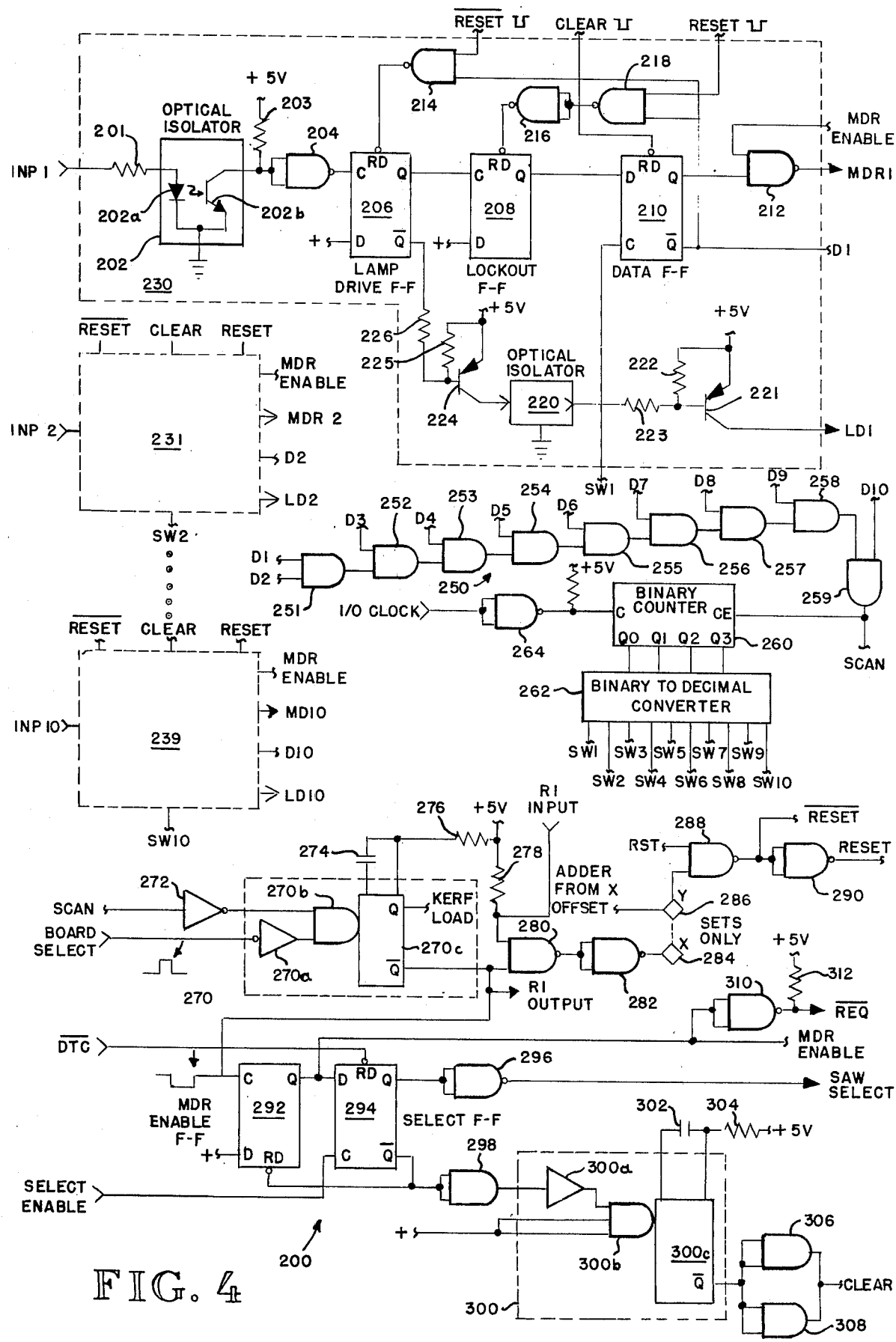
FIG. 4 is a schematic and timing diagram for one of the ten I/O boards into which data from the console is entered and stored.

Referring now to the schematic shown in FIG. 4, the operation of the I/O board will now be explained. It is once again emphasized that there are ten I/O boards in the entire system and the I/O board shown in FIG. 4 services only one group of switches, shown in the console 100. Ten input latches 230 through 239 are provided for recording the activation of each switch. It should be noted that while ten input latches are provided, some of the groups of switches shown in FIG. 2 do not contain ten switches. Therefore, all of the input latches on an I/O board will not be utilized. Since all of the input latches 230 through 239 are identical, an explanation of the operation of input latch 230 will suffice to explain the operation of all other input latches 231 through 239. When the leftmost switch in any group is depressed, INP1 will receive a voltage level causing current to flow through resistor 201 into optical isolator 202. Optical isolator 202 consists of a light-emitting diode 202a optically coupled to a phototransistor 202b. When current flows into the optical isolator 202, the light emitted from LED 202a saturates phototransistor 202b, thereby allowing current to flow through pull-up resistor 203 to bring the input to NAND gate 204 to ground potential. Therefore, in this configuration, optical isolator 202 acts as an invertor. To facilitate explanation of the remainder of this circuit, a logic high level will be referred to as a 1 and a voltage at ground potential will be referred to as a 0. Thus, when INP1 is activated, the 0 at the output of optical isolator 202 will be inverted by NAND gate 204 to clock the 1 at the D input of lamp drive flip-flop 206 to the Q input of lamp drive flip-flop 206 and a 0 to the $\overline{Q}$ output of lamp drive flip-flop 206. The 0 at the $\overline{Q}$ output of lamp drive flip-flop 206 draws current resistors 225 and 226 to saturate transistor 224, causing current to flow into optical isolator 220. The phototransistor in the optical isolator 220 will then be saturated, drawing current through resistors 222 and 223, thereby saturating transistor 221. The lamp driver output LD1 will then be approximately 5 volts to illuminate the lamp in the input switch corresponding to INP1. The lamps could be driven from some other voltage source, such as 24 volts by connecting the other voltage source to the emitter of transistor 221.

The I/O board includes a binary counter 260 which is driven by an externally generated I/O clock through NAND gate 264, acting as an invertor. Binary counter 260 repetitively counts to ten and drives binary-to-decimal convertor 262. However, binary counter 260 will respond to the I/O clock only when SCAN, and thus the clock enable input (CE), is 1. As the binary counter 260 repetitively counts to ten, each of the outputs of binary-to-decimal convertor 262 (SW1 to SW10) will sequentially rise to 1 for one clock pulse. Therefore, whenever the CE input to binary counter 260 is 1, binary-to-decimal convertor 262 acts as a scanner to sequentially interrogate each of the input latches 230 through 239.

When the lamp drive flip-flop 206 is clocked, the o to 1 transition at the Q output of lamp drive flip-flop 206 clocks a 1 to the Q output of lock out flip-flop 208 to enable the data flip-flop 210 by placing a 1 at its D input. It is assumed that during this time, the reset terminals RD of flip-flops 206, 208 and 210 are at 1. As explained above, the SW inputs to the input latches 230 through 239 are sequentially pulsed to interrogated each switch. When the input latch is interragated, the 0 to 1 transition on the SW1 input will clock the 1 at the D input to data flip-flop 210 to its Q output. At the same time, the 0 at the $\overline{Q}$ output of the data flip-flop 210 (D1) produces a 1 at the output of NAND gate 218 which is inverted by NAND gate 216 to reset the lock out flip-flop 208.

The operation of binary counter 260 is controlled by a daisy chain 250. Daisy chain 250 is composed of a plurality of AND gates 251 through 259 having inputs D1 through D10. The output of the daisy chain 250 (SCAN) will be 1 if, and only if, all of the inputs to the daisy chain D1 through D10 are 1.

When the data flip-flop 210 is set, the 0 at its $\overline{Q}$ output D1 disables the binary counter 260 through daisy chain 250, thereby holding the output of binary-to-decimal convertor 262 at SW1. The 0 at the Q output of the data flip-flop 210 also disables NAND gate 214 by holding its output at 1.

When the output of the daisy chain 250 is at 0, one shot 270 will be enabled through invertor 272. As will be explained hereinafter, each of the I/O boards is interrogated by the matrix board in sequence. When the I/O board 200 is addressed, a BOARD SELECT pulse will occur which will trigger one shot 270. The operation of a one shot such as 270 is well known to one skilled in art. An invertor 270a which, along with the input driven by inverter 272, drives AND gate 270b. When both of the inputs to AND gate 270b are 1, a pulse will be produced by one shot 270c, the width of which is determined by the RC time constant of capacitor 274 and resistor 276. The pulse from the $\overline{Q}$ output of one shot 270c is a negative going pulse from the normally 1 level of the $\overline{Q}$ output. When board 200 is interrogated by the matrix board 400, a positive going BOARD SELECT pulse occurs. The falling edge of the BOARD SELECT pulse triggers one shot 270 to produce a negative going pulse from the $\overline{Q}$ output of one shot 270. The rising edge at the end of the pulse from one shot 270 sets MDR enable flip-flop 292 to make MDR ENABLE 1 and $\overline{REQ}$ 0 and to enable select flip-flop 294. Since MDR ENABLE is now 1, the 1 at the Q output of data flip-flop 210 is now able to pass through NAND gate 212 to drive MDR1, the matrix input, to 0. The falling edge of $\overline{REQ}$ is transmitted to the matrix board 400 to inform the matrix board that data is available from the group of switches being addressed.

A short time after the falling edge of $\overline{REQ}$, a SELECT ENABLE pulse is transmitted from the matrix board to set the select flip-flop 294. SAW SELECT, the output of NAND gate 296, then falls to 0 to enable the comparator for the saw corresponding to the I/O board being addressed, as will be explained hereinafter.

The I/O board for the sets is basically the same as the I/O board for the adder, except for one feature. As mentioned above, only one switch may be selected at any one time from the sets group of switches, but any number of adder switches can be simultaneously selected. Furthermore, selection of a new sets value will automatically reset the combination of switches selected in the adder group. For this reason, the terminal 284, at the output of NAND gate 282, is connected to the terminal 286 in both the sets I/O board and the adder I/O board. Thus, when a BOARD SELECT pulse is transmitted to a sets I/O board, a negative going pulse is produced at the output of NAND gate 282 through NAND gate 280 to produce a $\overline{RESET}$ pulse at the output of NAND gate 288 and a RESET pulse at the output of NAND gate 290. As will be explained hereinafter, when the data from an I/O board for a given saw is transmitted to the matrix board, a CLEAR pulse is produced which resets data flip-flop 210 to enable NAND gates 218 and 214. Thus, if a particular combination of a sets switch and adder switches is selected and this combination has been transmitted to the matrix board, the selection of a new sets switch will cause a reset pulse to reset lamp drive flip-flop 206 and lock out flip-flop 208 on the I/O boards for the adder and sets for that saw. When the data from the output of the I/O board has been received by the matrix board 400, a data transfer complete (DTC) pulse is transmitted to the I/O board 200 to reset select flip-flop 294. This DTC pulse resets the select flip-flop 294, thereby making SAW SELECT 1 and triggering one shot 300 to produce a negative going clear pulse at the outputs of AND gates 306 and 308. The CLEAR pulse resets the MDR enable flip-flop 292, thereby disabling output NAND gate 212, and returning $\overline{REQ}$ to 1. The CLEAR pulse also resets the data flip-flop 210 to make SCAN 1 through daisy chain 250. Binary counter 260 is then enabled, allowing binary-to-decimal convertor 262 to scan through the remaining input latches 231 through 239.

In summary, activation of an input switch sets lamp drive flip-flop 206 and lock out flip-flop 208 to enable the data flip-flop 210. When the input latch 230 is addressed by binary-to-decimal convertor 262, the data flip-flop is set, thereby holding the output of binary-to-decimal convertor 262 at SW1, enabling one shot 270 and outputting a 1 to NAND gate 212. When the I/O board 200 is addressed by the matrix board 400, a BOARD SELECT pulse will occur which will trigger one shot 270 to set MDR enable flip-flop 292 and enable select flip-flop 294. The MDR ENABLE signal will then transmit an MDR1 0 signal to the matrix board 400. Simultaneously, an $\overline{REQ}$ signal will be transmitted to notify the matrix board 400 that data is present on I/O board 200. Matrix board 400 will then transmit back a SELECT ENABLE signal which will set select flip-flop 294. Thereafter, a DTC pulse will occur which will reset select flip-flop 294 to reset MDR enable flip-flop 292, thereby removing the output from NAND gate 212 and triggering one shot 300 to produce a CLEAR pulse. The CLEAR pulse will then reset the data flip-flop 210 to allow the binary-to-decimal convertor 262 to resume its scanning sequence. The matrix board 400 first addresses the adder I/O board and then the sets I/O board for each saw. After the data has been read from the I/O boards for both the adder switches and the sets switches, the data flip-flop 210 for both I/O boards will have been reset by the CLEAR pulse after the data is transmitted to the matrix board. Thus, NAND gates 214 and 218 will be enabled. Subsequently, if a new sets switch if selected, a reset pulse will occur which will reset lamp drive flip-flop 206 and lock out flip-flop 208 in the I/O board for the adder corresponding to the sets group on which the new selection is made.

Figure 5A:
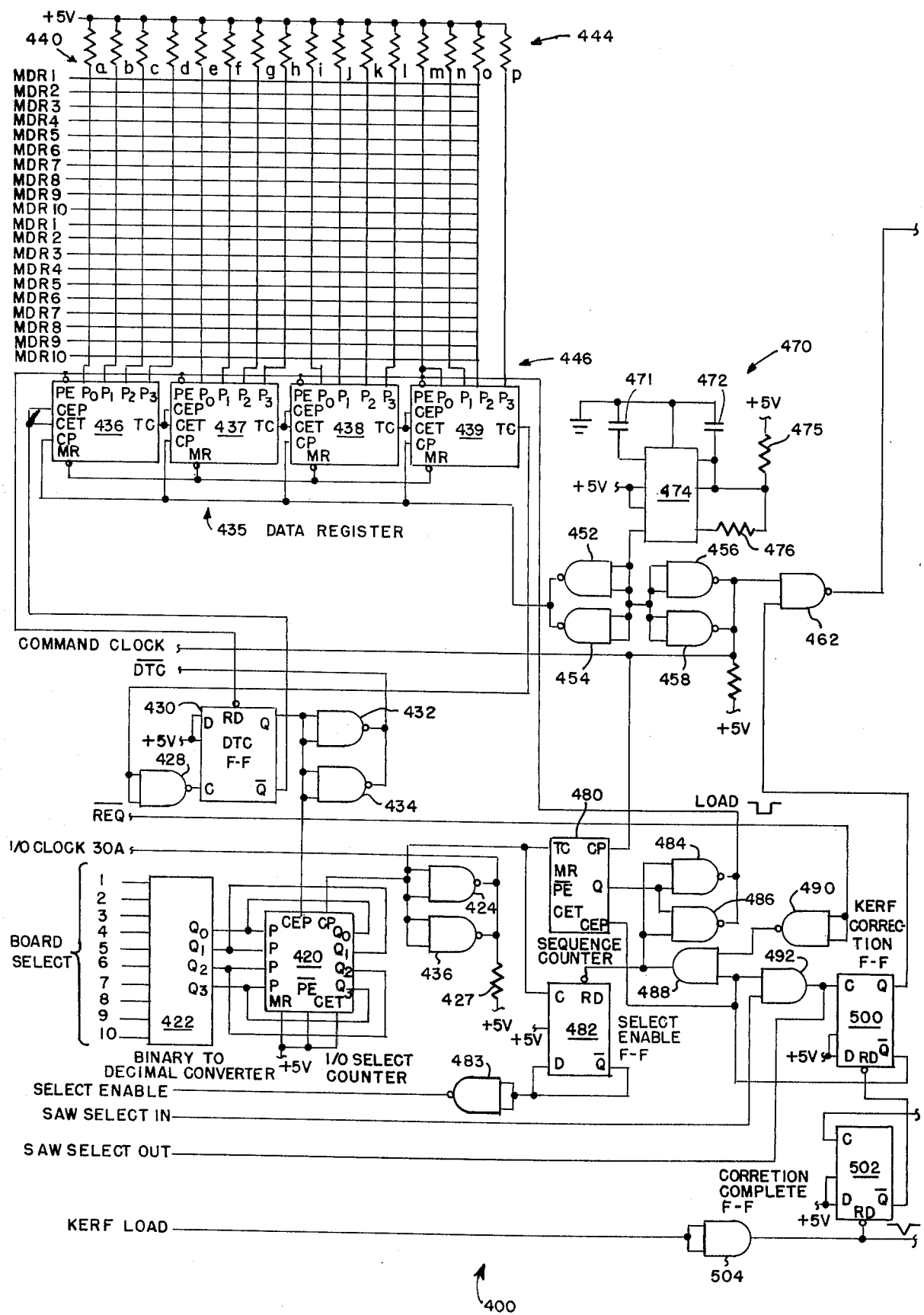
Figure 5B:
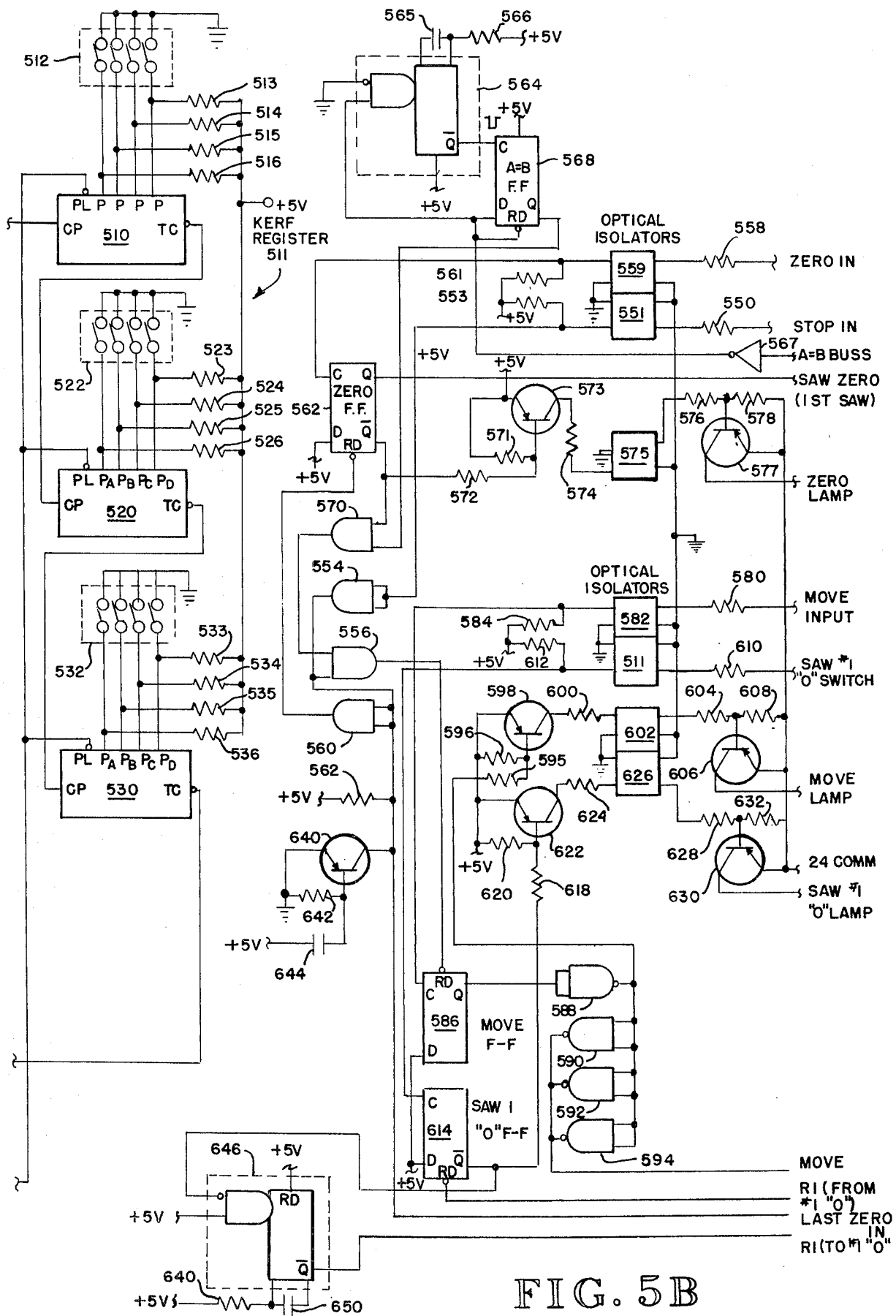
Figure 5C:
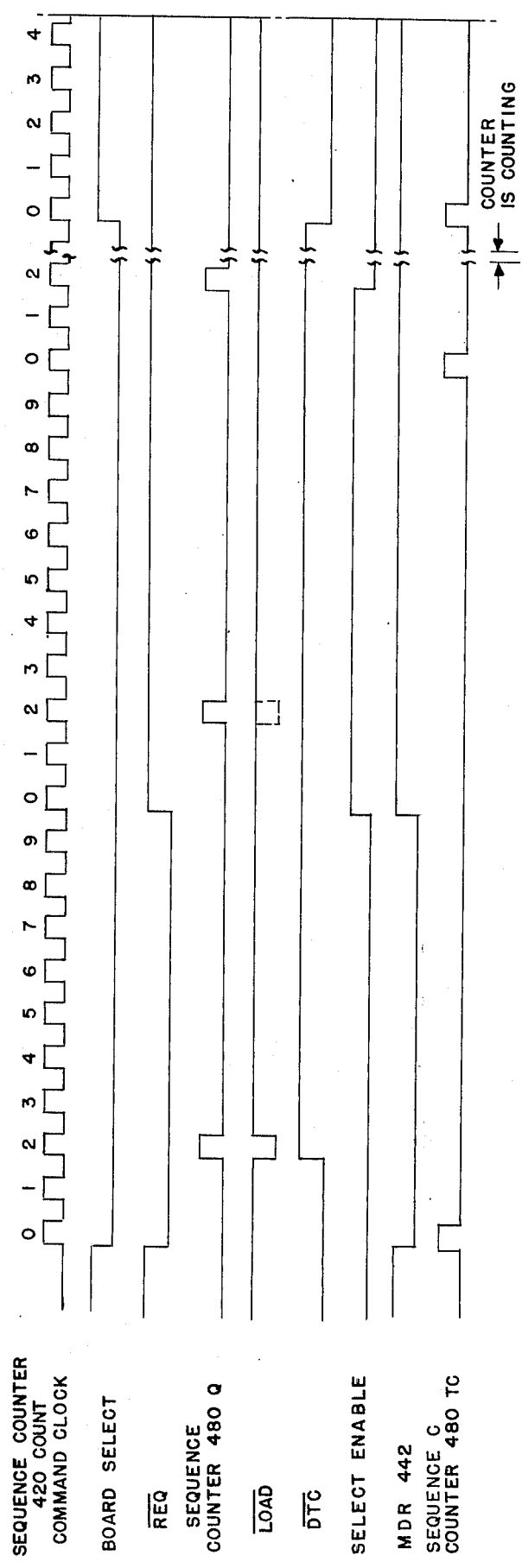

The operation of the matrix board will now be explained by reference to the schematic shown in FIGS. 5A and 5B and the accompanying timing diagram shown in FIG. 5C. The clock 470 is normally free running to generate COMMAND CLOCK pulses at the output of NAND gate buffers 452, 454, 456 and 458. The command clock frequency is determined by the RC time constant of resistor 475 and capacitor 472. The command clock drives the sequence counter 480, which repetitively counts to ten. When the sequence counter 480 is enabled by having its CEP input at 1, it will transmit I/O CLOCK pulses through NAND gates 424, 426 to the I/O boards which will be 1/10 the frequency of the COMMAND CLOCK. The sequence counter 480 thus acts as a divide-by-10 frequency divider. It is also used to sequence the operation of the remaining system.

The I/O CLOCK pulses from the TC output of the sequence counter 480 increment the I/O select counter 420 which repetitively counts to ten when enabled by having its CEP input at 1. The I/O select counter 420 drives the binary-to-decimal convertor 422 to sequentially activate each of its BOARD SELECT outputs. Each of the BOARD SELECT outputs is connected to the BOARD SELECT input of the ten I/O boards in the system. It will be recalled from the explanation of the operation of the I/O boards that the 1 to 0 transition of the BOARD SELECT pulse causes the $\overline{REQ}$ line to fall to 0 if data is contained within the I/O board that is being addressed. For example, if data is contained in the number 7 I/O board when the number 7 BOARD SELECT line falls to 0 and the number 8 board select line rises to 1, the $\overline{REQ}$ line will fall to 0 to inform the matrix board that data is contained in the number 7 I/O board. The $\overline{REQ}$ 0 is inverted by NAND gate 490 to place a 1 at the output of AND gate 488, thereby removing the disable on the RD terminal of select enable flip-flop 482 and enabling NAND gates 484 and 486. When the sequence counter 480 reaches the 2 count, the COMMAND CLOCK pulse will be gated to the Q1 output of the sequence counter 480, thereby producing a negative going $\overline{LOAD}$ pulse at the output of enabled NAND gates 484 and 486. As will be explained hereinafter, the $\overline{LOAD}$ pulse presets the data register 435 to a number corresponding to the desired saw blade position and resets the DTC flip-flop 430. The 0 at the Q output of DTC flip-flop 430 is inverted by NAND gates 432 and 434 to place a 1 on the $\overline{DTC}$ line and disables the I/O select counter 420 by holding its CEP input at 0. Since the I/O select counter 420 will no longer respond to I/O CLOCK pulses, the number 8 board select line will remain activated and the sequential address of the I/O boards will be suspended.

It will be recalled that data contained within the I/O board is presented to the output when the $\overline{REQ}$ line falls to 0. Thus, two clock pulses later, when the $\overline{LOAD}$ pulse occurs, the data will be available to the matrix input 442 for read-in to the data register 435. It will be remembered that the I/O board data only provides information that particular console push buttons have been activated. It does not assign a dimension to that switch. The purpose of the matrix 440 is to assign a predetermined and programmable dimension to each push button on the console 100. As will be explained hereinafter, it is necessary to insert the compliment of the dimension into the data register 435. This is accomplished by programming each input line by attaching diodes between the input line and appropriate power lines 444a through p. Thus, if line number 1 of input 442 (MDR1) is to correspond to 12.35 inches, the BCD compliment of that number must be presented to the data register when the MDR1 line falls to 0. Thus, the number 0111 ($\overline{1}$) must be entered into counter 439, the number 1011 ($\overline{2}$) in counter 438, the number 0011 ($\overline{3}$) in counter 437 and the number 0101 ($\overline{5}$) in counter 436. This is accomplished by connecting the anodes of diodes to power lines 444a, c, e, f, j and m. The cathodes of the diodes are connected to the MDR1 line of inputs 442. Thus, when the MDR1 line is driven to 0 and the $\overline{LOAD}$ pulse occurs, the binary complement of 1 will be entered into counter 439, the binary complement of 2 will be entered into counter 438, the binary complement of 3 will be entered into counter 437, and the binary complement of 5 will be entered into counter 436.

On the 2 count of sequence counter 480, the $\overline{LOAD}$ pulse thereby generated resets the DTC flip-flop 430, placing a 1 on its $\overline{Q}$ output, which enables counter 436 to respond to COMMAND CLOCK pulses from the output of NAND gates 452 and 454. The data register 435 will continue to count COMMAND CLOCK pulses from the number preset in the data register 435 until all of the counters 436 to 439 have reached their maximum value, at which time the TC output of counter 439 will rise to 1, thereby setting the DTC flip-flop 430 through NAND gate 428. The data register 435 is provided to generate a number of pulses corresponding to the number preset in the data register 435 by the $\overline{LOAD}$ pulse. Since the counter 436 is incremented and not decremented, it is necessary to place the complement of the desired number in the data register 435. Thus, if 0325 is to be entered into the data register 435, a 16 (1111, the binary complement of 0) will be entered into counter 439, a 12 (0011, the binary complement of 3) will be entered into counter 438, a 13 (1011, the binary complement of 2) will be entered into counter 437, and a 10 (0101, the binary complement of 5) will be entered into counter 436. The data register 435 will then be incremented by clock pulses until 325 clock pulses have been counted and thus all of the counters 436 to 439 have been incremented to 16. After 325 pulses have been counted, the DTC flip-flop 430 is set through NAND gate 428 to disable counter 436 by placing a 0 on its CEP input. The 1 at the Q output of DTC flip-flop 430 enables the I/O select counter 420 to once again resume the address sequence of the I/O boards. On the first 10 count of the sequence counter 480 after the $\overline{LOAD}$ pulse has been produced, the select enable flip-flop 482 will be set to make the SELECT ENABLE line at the output of NAND gate 483 1. This 0 to 1 transition will enable the select flip-flop 294 on the I/O board 200 to allow the I/O board to respond to the subsequent $\overline{DTC}$ pulse. The 1 to 0 transition of $\overline{DTC}$ at the outputs of NAND gates 432 and 434 notifies the particular I/O board being addressed that the data transfer has been completed and produces a CLEAR pulse to reset the I/O board.

The matrix board first interrogates the adder I/O board for a given saw and, as will be explained hereinafter, increments the command register 310 on the comparator board 700 for the saw corresponding to that adder the number of pulses transmitted by the data register 435. The BOARD SELECT line at the output of binary-to-decimal convertor 422 then addresses the sets I/O board for that saw and further increments the command register 810 on the comparator board 700 for the particular saw corresponding to that set. In this manner, the dimensions selected by the adder push buttons on the console for each saw are entered into the command register for that particular saw and the dimensions selected by the sets push button are added to the number previously stored in the command register by the adder push buttons to produce a number in the command register for each saw coresponding to the sum dimensions selected on the console 100.

Counters 510,, 520 and 530 and the associated circuitry comprise the programmable saw kerf correction for saw 1. As mentioned earlier, when the position register 860 for saw 1 is initialized to zero, the right edge of saw number 1 (1280a, FIG. 3) will be in alignment with the edge 1381 of the fence 1380. When a position is selected for saw 1, the width of the board cut by saw 1 (1280a) will be the distance from the edge 1381 of the fence 1380 to the left edge of the saw number 1 (1280a). Thus, when a given width is selected, saw 1 must be moved a distance corresponding to that width plus an additional distance equal to the width of the saw kerf. The saw kerf corrector for saw 1 transmits an additional number of pulses to the comparator board corresponding to the width of the saw kerf. Referring once again to FIG. 4, the 1 to 0 transition of $\overline{DTC}$ resets the select flip-flop 294 to place a 1 on the SAW SELECT line at the output of NAND gate 296. It will be remembered that the $\overline{DTC}$ line falls to 0 after a predetermined number of pulses have been counted by the data register 435, and thus the data transfer is complete. The 0 to 1 transition of SAW SELECT IN is gated through AND gate 492 on the matrix board to set kerf correct flip-flop 500 and to make SAW SELECT OUT a 0. The 0 on the SAW SELECT OUT LINE is tied to the SAW SELECT line on the comparator to enable the command register to respond to the additional saw kerf pulses. Since the saw kerf correction is needed only for saw number 1, the SAW SELECTS Outputs for all I/O boards other than those for saw number 1 bypass the matrix board and go directly to their corresponding comparator board to enable the command register. The 1 at the Q output of the kerf correct flip-flop 500 allows the NAND 462 to gate clock pulses to increment the counter 510 in the kerf register 511. The 0 at the $\overline{Q}$ output of the kerf correction flip-flop 500 disables AND gate 492 and places a 0 at the output of AND gate 488 to reset the select enable flip-flop 482 and disables NAND gates 484 and 486 to prevent the occurrence of additional $\overline{LOAD}$ pulses. Switches 512, 522 and 532 are set to the BCD number corresponding to the width of the saw kerf and are used to preset counters 510, 520 and 530. The operation of kerf register 511 is similar to the operation of the data register 435. The switches insert the BCD complement of the saw kerf upon the occurrence of a negative going KERF LOAD pulse at the output of AND gate 504. The KERF LOAD pulse, which also resets the correction complete flip-flop 502, is generated by the I/O board 200 just prior to the 1 to 0 transitioin of $\overline{REQ}$.

To summarize the operation of the kerf correction circuit through the counting stage, the 0 to 1 transition of SAW SELECT which occurs immediately after the 1 to 0 transition of $\overline{DTC}$ sets the kerf correction flip-flop 500. The 1 at the Q output of the kerf correction flip-flop 500 gates command clock pulses to the kerf register. The 0 on the $\overline{Q}$ output of the kerf correction flip-flop 500 disables the sequence counter 480, disables NAND gates 484 and 486 to prevent the occurrence of subsequent $\overline{LOAD}$ pulses and holds the output of AND gate 492 at 0 to enable the saw 1 command register to respond to clock pulses by receiving a 0 on saw select out. When the kerf register 511 has counted up to 999, the TC output of counter 530 rises to 1 to set the correction complete flip-flop 502, thereby resetting the kerf correction flip-flop 500. When the kerf correction flip-flop 500 has been reset, NAND gate 462 is disabled, AND gate 488 is enabled to allow subsequent $\overline{REQ}$ pulses to transfer data from the I/O boards to the matrix board, the sequence counter 480 is allowed to resume its count and a 1 is placed on the SAW SELECT OUT line to disable the saw 1 command register. Thus, the kerf correction circuit increments the saw 1 command register a predetermined number of pulses corresponding to the width of the saw kerf in addition to the number of pulses which have incremented the saw 1 command register as determined by the push buttons on the console 100.

The circuitry for performing the move, stop and zero functions initiated by the push buttons 160, 165 and 170 on the console 100 are also found on the matrix board. The MOVE INPUT line is connected to the move button 160 on the console 100. When the move button 160 is activated, current flows into optical isolator 582, saturating the phototransistor contained therein, drawing current through resistor 584 to place a 0 on the clock input to the move flip-flop 586. When the move input push button is released, the phototransistor in the optical isolator 582 cuts off and the 0 to 1 transition on the clock input to the move flip-flop 586 sets the move flip-flop 586 if the RD input is 1. The RD input is controlled by the A = B flip-flop 568. The A = B lines for all five comparators are connected to the A = B BUSS. If A is not equal to B for any of the comparators (i.e., the position register address is not equal to the command register address), the A = B BUSS will be 0. Thus, when the new saw positions are entered into the command registers, the A = B BUSS line will go from 1 to 0, thereby triggering one shot 564 to set A = B flip-flop 568, allowing the RD input to the move flip-flop 586 to be 1 through AND gates 570 and 556. THe 1 at the Q output of the move flip-flop 586 drives NAND gates 590, 592 and 594 through NAND gate 588 to place a 1 on the MOVE line which is transmitted to other boards in the system. The 0 at the output of NAND gate 588 also draws current through resistors 595 and 596 to saturate transistor 598, causing current to flow through resistor 600 into optical isolator 602. The phototransistor in optical isolator 602 then saturates, drawing current through resistors 604 and 608 to draw current through the base of transistor 606 and place 24 volts on the MOVE LAMP output. The move lamp is internal to the move push button 160, and thus, when the move button 160 has been activated, a visual indication of that condition will be present. The MOVE signal is transmitted to the comparator boards for each saw and enables the circuits which drive the step motors.

As mentioned previously, the position registers in the comparator are initialized by moving all of the saws to their leftmost positions. This is accomplished by pressing the zero push button 170 on the console 100. When the zero push button 170 is activated, current flows through resistor 558 into optical isolator 559, thereby illuminating the light-emitting diode contained therein. The phototransistor contained within the optical isolator 559 then saturates, drawing current through resistor 561 to place a 0 on the clock input to the zero flip-flop 562. When the zero push button 570 is released, the 0 to 1 transition of the clock input to the zero flip-flop 562 sets the flip-flop 562, making the 0 start line at the Q output of the zero flip-flop 562 1. As will be explained hereinafter, this causes each of the saws to move in sequence to its leftmost position.

As mentioned previously, the motion of the saw blades may be terminated at any time by activating the stop push button 165. When the stop push button 165 on the console 100 is activated, current flows through resistor 550 into the optical isolator 551 to saturate the phototransistor contained therein and draw current through resistor 553. The low voltage at the output of the optical isolator 560 places a 0 at the output of AND gate 554 which resets the move flip-flop 586 through AND gate 556 and resets the zero flip-flop 562 through AND gate 560. Thus, the movement caused by either the move flip-flop 586 being set or the zero flip-flop 562 being set is terminated by depressing the stop push button 165.

The zero flip-flop 562 is also reset by a negative going LAST ZERO In pulse through AND gate 560. This occurs when all of the saws have been moved to their leftmost positions and the position register has been initialized. When the zero flip-flop 562 is set, a visual indication of that condition is provided by applying power to a light in the zero push button 170 by raising the ZERO LAMP output to 24 volts. This is accomplished by the 0 at the $\overline{Q}$ output of the zero flip-flop 562 drawing current through resistor 572, thereby causing current to flow through the base of transistor 573 to saturate transistor 573 and to illuminate the light-emitting diode in the optical isolator 575 through resistor 574. The phototransistor contained within the optical isolator 575 then saturates, causing current to flow through resistors 578 and 576 to saturate the transistor 577 and raise the ZERO LAMP output to 24 volts.

The move flip-flop 586 is also reset when each of the saws has reached its desired position. When the saw position corresponds to the corresponding address in the command register, the A = B BUSS output for all comparator boards will be 1, thereby resetting the A = B flip-flop 568 through invertor 567. The 0 at the Q output of the A = B flip-flop 568 propagates through AND gates 570 and 556 to reset the move flip-flop 586 by placing a 0 on its RD input.

As mentioned previously with reference to FIG. 2, a saw position is selected for each saw by activating a sets push button and a number of adder push buttons. The leftmost push buttons for the adders of all saws are labeled 0. When the zero push button for each saw is activated, the saw corresponding to that 0 will move to its leftmost position. With the exception of saw number 1, the leftmost position for each saw is 3 ¾ inches away from its adjacent saw. Thus, when the zero push buttons for the adders 122, 132, 142 and 152 are activated, their corresponding saws will be 3 ¾ inches away from their adjacent saws. However, when the zero push button of the adder 112 is activated, saw number 1 moves all the way to the left. Therefore, while the zero push buttons for adders 122, 132, 142 and 152 can be wired in parallel to the 3 ¾ buttons on sets 124, 134, 144 and 154, a separate circuit must be provided for the zero push button on the adder 112. When the zero push button for the adder 112 is activated, current flows into optical isolator 611 through resistor 610 to saturate the phototransistor contained therein. Current is then drawn through resistor 612 to place a 0 at the clock input to the saw No. 1 0 flip-flop 614. When the saw number 1 zero switch 111 is released, saw No. 1 0 flip-flop 614 is set, thereby placing a 0 on its $\overline{Q}$ output. The 0 thereby produced draws current through resistors 620 and 618 to cause current to flow through the base of transistor 622 to saturate transistor 622 and cause current to flow into the optical isolator 626 through resistor 624. The phototransistor contained within the optical isolator 626 then saturates, causing current to flow through resistors 628 and 632 to saturate transistor 630, thereby placing 24 volts on the saw No. 1 0 lamp contained within push button 111. When saw No. 1 0 flip-flop 614 is set, the 1 to 0 transition on the $\overline{Q}$ output triggers one shot 646 to generate a negative going pulse on the R1 (to No. 1 0) line. THis resets the circuits in the adder I/O board for saw number 1. Subsequently, a new value is selected for saw number 1 and, when the sets I/O board for saw number 1 is addressed, an R1 output pulse is produced which resets the saw No. 1 0 flip-flop 614.

When power is initially applied to the system, the command register and position registers will be set to random values and the flip-flops will normally be randomly set or reset. Under these circumstances, the movement of the saws would be unpredictable. Therefore, means are provided to initially reset the zero flip-flop 562 and the move flip-flop 586 to insure that the saw blades do not move until either the move and zero push buttons are depressed. When power is initially applied to the system, the 5 volt step on one end of capacitor 644 is transferred to the base of transistor 640 to saturate transistor 640 and ground the inputs to AND gate 560. This will place 0's on the reset terminals of the zero flip-flop 562 and the move flip-flop 586 through AND gate 556. After several RC time constants of resistor 642 and capacitor 644, transistor 640 will cut off, allowing the inputs to AND gate 560 to return to 1.

Figure 6A:
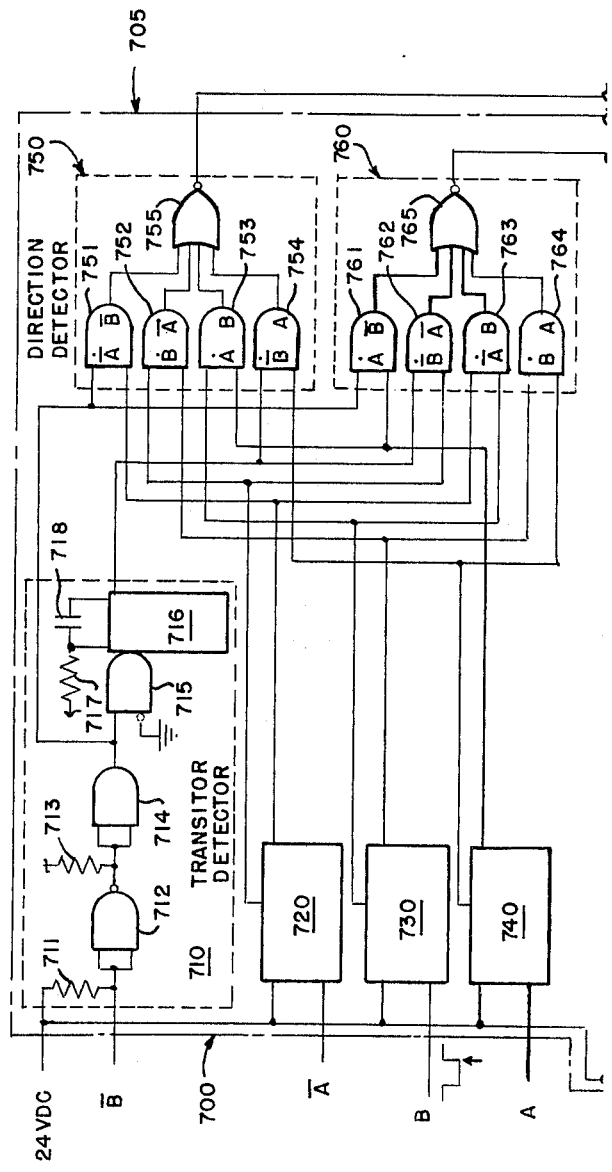
Figure 6C:
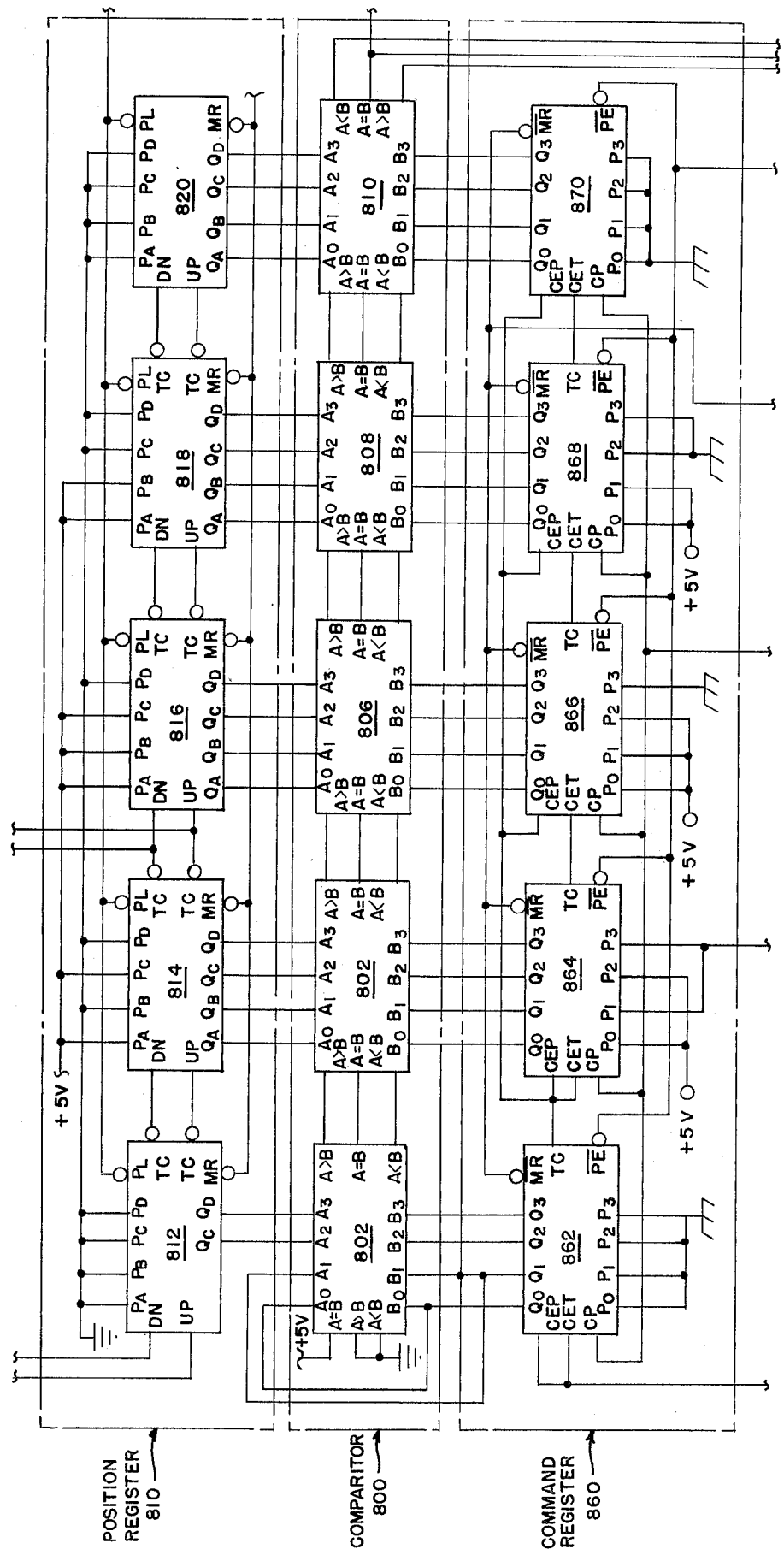

The operation of the comparator board which is included for each of the five saws will be explained by reference to the schematic shown in FIGS. 6A, 6B and 6C, and the accompanying timing diagram shown in FIG. 6D.

It will be recalled that a shaft encoder 1206 (FIG. 1) is driven by the control shaft 1210. The lead screw in the cylinder 1240, which drives the control shaft 1210, has a 1/5 pitch (i.e., the shaft will move 1 complete rotation of 360° for each 1/5 or 0.200 of the rod 1360). The encoder 1206 produces phase A pulses and 200 phase B pulses for each rotation of the shaft. Phase B pulses lead or lag phase A pulses by 90°. The encoder also provides the complements of these pulses, $\overline{A}$, $\overline{B}$. The 90° lag or lead of B with respect to A is used logically to define the direction of movement. Since there are 200 pulses per revolution of the encoder, there is 1 pulse for each 0.001 movement. This establishes the basic resolution of the system.

The complements of the A and B pulse train are used to effectively multiply the resolution by 2 or 4 in a relatively simple logic arm. The complements could be generated on the board and the same logic could be used to generate 2 or 4 times the number of pulses actually produced. This is possible because of the quadrature nature of A and B.

Figure 6D:
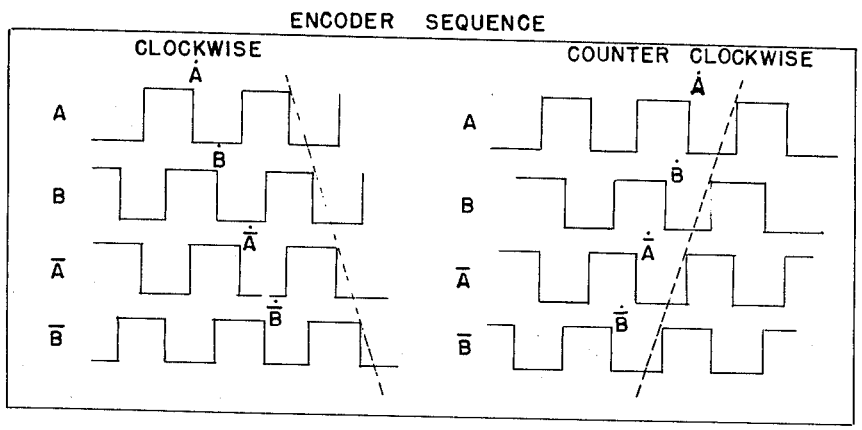

The encoder sequence is shown in FIG. 6D for clockwise rotation and counterclockwise rotation. For clockwise rotation, the A pulse is produced, followed by the B pulse, followed by the $\overline{A}$ pulse, followed by the $\overline{B}$ pulse. For counterclockwise rotation, the encoder produces pulses in the reverse sequence. Feedback buffer 705 (FIG. 6A) receives the encoder pulses and determines in which direction the shaft is rotating. The feedback buffer 705 contains four transition detectors, 710, 720, 730 and 740. Each of the transition detectors 710 through 740 produces a short positive going pulse when its input goes from 1 to 0. Referring once again to FIG. 6D, it will be noted that for clockwise rotation, the 1 to 0 transition of the A pulse ($\dot{A}$) occurs during the B pulse, $\dot{B}$ occurs during the $\overline{A}$ pulse, $\dot{\overline{A}}$ occurs during the $\overline{B}$ pulse and $\dot{\overline{B}}$ occurs during the A pulse. For counterclockwise rotation, $\dot{B}$ occurs during the $\overline{A}$ pulse, $\dot{\overline{A}}$ occurs during the B pulse, $\dot{\overline{B}}$ occurs during the A pulse and $\dot{A}$ occurs during the $\overline{B}$ pulse. There is a unique sequence for each direction of rotation which is sensed by the feedback buffer 705 to produce a signal indicative of direction. Since all of the transition detectors 710 through 740 are identical, only the operation of transistion detector 710 will be explained. THe 1 to 0 transition of $\overline{B}$ is inverted by NAND gate 712 to produce a 0 to 1 transition at the output of AND gate 714 which triggers one shot 716 through AND gate 715. A pulse is then produced determined by the product of resistance 717 and capacitance 718. The pulse produced by the transition detector 710 appears at the output of AND gate 754 if the shaft rotation is clockwise since, at that time, A will also be 1. On the other hand, if the shaft rotation is counterclockwise, the pulse produced by transition detector 710 will appear at the output of AND gate 762 since $\overline{A}$ will be 1 at that time. Thus, if the control shaft 1210 is rotating clockwise, four pulses will be produced at the output of AND gates 751 through 754 for each rotation of the shaft and no pulses will be produced at the outputs of AND gates 761 through 764. On the other hand, if the control shaft 1210 is rotating counterclockwise, four pulses will appear at the outputs of AND gates 761 through 764 for each rotation of the control shaft 1210 but no pulses will appear at the output of AND gates 751 through 754. NOR gates 755 and 765 receive the pulses from the AND gates 751 through 754 and 761 through 764, respectively, and generate a negative going pulse for each pulse received therefrom. Therefore, for each clockwise rotation of the shaft, NOR gate 755 will output four negative going pulses, and for each counterclockwise rotation of the control shaft 1210, NOR gate 765 will output four negative going pulses. As will be explained hereinafter, the pulses from direction detectors 750 and 760 increment or decrement position register 810.

The quadrature signal also causes the output of 750 and 760 to be manually exclusive and thus provides and guarantees anti-coincidence so that no counts can be missed even if a reversal occurs instantaneously.

The actual position of each saw is recorded by the position register 810 and compared with the desired location for each saw, which is recorded by command register 860. The comparison is accomplished by comparator 800. As mentioned previously, the position register 810 is initialized by moving all of the saws to their leftmost positions. Each saw is provided with a normally closed limit switch 1400 (FIG. 1) which is connected to reference enable. When the saw is in its leftmost position, the REFERENCE ENABLE line rises to 24 volts through pull-up resistor 840, thereby illuminating the light-emitting diode contained within the optical isolator 841. Current is then drawn through resistor 844, placing a 0 on the input to invertor 847a to enable one shot 847. The limit switch 1400 does not provide optimum accuracy and, therefore, a more accurate marker is provided from the encoder. The ENCODE MARKER input to the comparator board is connected to the A output of the encoders 1206 on the control shafts 1210 for each saw. Thus one ENCODER MARKER pulse is produced for each revolution. The ENCODE MARKER pulse is transmitted to AND gate 846 through emitter follower transistor 651 to trigger the one shot 847 if the MOVE input to NAND gate 850 is 0. One shot 847 then produces a saw at 0 pulse. The saw at 0 pulse is inverted by NAND gate 822 to preset the counters 812, 814, 816, 818 and 820 in the position register 810 to a predetermined number. The number to which the position registers are preset is purely arbitrary since the command register can also be preset to that number. When the command register is incremented to a value above that preset number the position register 810 will also be incremented to that number by causing the stepper motor 1204 to rotate the control shaft 1210 and hence the encoder 1206 a predetermined distance. In the system shown in FIGS. 6A and 6B, the position register 810 is preset to 3750. Thereafter, the number stored in the position register 810 will decrement four units for each clockwise revolution of the control shaft 1210 and will increment four units for each counterclockwise rotation of the control shaft 1210. Thus, if a saw is moved to its leftmost position and then the control shaft makes 83 counterclockise revolutions, the new number stored in the position register 810 will be 4082 (3750 plus (4 × 332)).

The command register 860, which is comprised of counters 862, 864, 866, 868 and 870, is preset by the R1 pulse which occurs after the data has been read from the adder and sets I/O boards for each saw. In the comparator board for saw 1, the SAW 1 GROUND input is at 0, thereby enabling NAND gate 882 through NAND gate 884. Thus, when the negative going R1 pulse occurs, it will be inverted by NAND gate 886 to reset the command register 860 and 3.75 will thereafter be entered into the command register 860 by the R1 pulse passing through NAND gate 882. Thus, the command register for saw 1 is preset to 3.75 by each R1 pulse. The SAW 1 GROUND lines for the comparator boards for saws 2 through 5 are left open and pull-up resistor 883 places at 1 on the input to NAND gate 884 to disable NAND gate 882. The 1 on the saw ground input also enables NAND gate 886 so that the negative going R1 pulse which is inverted by NAND gate 880 passes through NAND gate 886 to reset the command register 860 to 0. Thus, each R1 pulse resets the command register 860 for saws 2 through 5 to 0.

Data is entered into the command register 860 by incrementing the command register 860 a number of pulses as predetermined by the number stored in the data register 435 of the matrix board 400. As will be recalled from the discussion of the matrix board 400, data is read from each I/O board and given a dimension corresponding to each particular matrix drive input 442. The complement of this number is then preset in the data register 435. During the time that the data register 435 is being incremented, SAW SELECT will be 0. The SAW SELECT input to the comparator board enables counter 862 of the command register 860 through NAND gate 894. Thus, while data register 435 on matrix board 400 is incrementing from the number entered therein, the command register 860 is also incrementing. When the data register 435 has reached its maximum count, the TC output of counter 439 sets the DTC flip-flop 430 through NAND gate 428 to return the $\overline{DTC}$ line to 0. The $\overline{DTC}$ signal is transmitted to the I/O board and its 1 to 0 resets the select flip-flop 294, thereby generating a 1 on the SAW SELECT line at the output of NAND gate 296. The 1 on the SAW SELECT line is transmitted to the comparator board and inverted by NAND gate 896 to disable the command register 860.

The SAW SELECT input to the comparator board for each saw is connected to the SAW SELECT output for the sets I/O board and the adder I/O board for the corresponding saw. Thus, the command register 860 for each saw will be enabled once when the data that has been entered into the data register 435 from the adder I/O card is transmitted to the comparator board and once again when the data entered into the data register 435 from the sets card is being transmitted to the comparator board.

In summary, the position register 810 is initialized by moving the saws to their leftmost position where their location is known. The position register 810 is subsequently incremented or decremented, depending upon in which direction the control shaft 1210 is rotating, by the pulses transmitted by direction detectors 750 and 760. The command register is reset each time data is transmitted from a sets I/O board. When the matrix board receives an input from an I/O board, it assigns a dimension to that input and places that dimension into the data register 435. The data register 435 and the command register 860 are then simultaneously incremented until the data register 435 has been filled with 1's. At this point, the data register 435 and the command register 860 are both disabled to prevent the registers from responding to subsequent clock pulses.

The comparator 800 compares the number contained in position register 810 with the number contained in the command register 860. Each individual comparator 802, 804, 806, 808 and 810 first compares the A inputs from the position register 810 to the B inputs from the command register 860 to determine whether binary number A is greater than, equal to or less than binary number B. The comparators 802, 804, 806, 808 and 810 will then look for a coincidence on their A = B, A > B, or A < B inputs. For example, if counter 816 is at 1010 and counter 866 is at 1111, comparator 806 will note that B is greater than A and will then examine its B > A input. If the B > A output of comparator 804 is 1, the B > A output of comparator 806 will also be 1. In this manner, the outputs of comparator 810 provide an indication of the comparison between all of the counters in the position register 810 and the counters in the command register 860. As will become apparent, the A > B signal is used to vary the position of the control shaft 1210 to reduce the value of A. If A is less than B, the A < B signal is used to vary the position of control shaft 1210 to increase the value of A. The A = B output indicates that control shaft 1210 is in its correct position and no movement is necessary. As mentioned previously, the A = B outputs of the comparator boards are connected to the A = B BUSS. When the position register address is equal to the command register address for all five comparator boards, the A = B BUSS line will be 1, thereby resetting the move flip-flop 586 (FIG. 5B) on the matrix board to indicate that all saws are in their desired position. The saws are stopped individually by their exclusive A = B signal. This is necessary because all saws are commanded to move simultaneously, but some saws may move farther, thus longer, than others due to differences in commanded movements.

The remaining circuitry on the comparator board is used to generate a series of right drive pulses if A is less than B and a series of left drive pulses if A is greater than B or if the zero button 170 is pressed on the console 100. This circuitry includes a variable frequency oscillator 900 which provides pulses at a predetermined frequency and reduces the frequency of those pulses as the position of the control shaft approaches the desired position. Free-running oscillator 934 transmits motor drive pulses to NAND gates 954 and 960. The frequency of the oscillator 934 is determined by the RC time constant of capacitor 936 and the parallel combination of resistors 932, 930, 928 and the resistance of FET 926. The resistance of FET 926 can be varied to vary the time constant and hence the oscillation frequency of motor drive oscillator 931. The resistance of FET 926 is controlled by inverting transistor 922, which is pulsed by NAND gate 918 through resistor 920. The pulse output of transistor 922 is integrated by capacitor 923 to provide a relatively constant voltage to the gate of FET 924. Pulses are transmitted to the input of NAND gate 918 from one shot 897 each time the position register 810 stops decrementing and starts to increment or stops incrementing and starts to decrement. This will sometimes occur when the control shaft is dithering about the correct shaft position. Under these circumstances, the circuit will reduce the frequency of the motor drive oscillator 900. The dithering is detected by NAND gates 906, 902, 904 and 908. During normal operation of the system, the inputs to NAND gates 906 and 902 will never be 1 at the same time. Therefore, the output from NAND gate 906 will normally be 0. Similarly, the inputs to NAND gates 904 and 908 will normally never be 1 at the same time. When both inputs to the aforementioned gates are 1 at the same time, an indication of dithering is produced and the frequency of the motor drive oscillator 900 is reduced.

RIGHT DRIVE pulses are produced when AND gate 960 is enabled, thereby allowing motor drive oscillator pulses to pass therethrough and be inverted by NAND gate 964. NAND gate 960 will be enabled whenever both inputs to AND gate 952 are 1. This will occur if the normally opened right limit switch 1400 has not been activated, thereby grounding the right limit line entering AND gate 952. The output of NAND gate 951 will be 1 whenever A is less than B and the MOVE input to AND gate 940 is 1. Thus, series of pulses will be generated on the RIGHT DRIVE line whenever the move flip-flop in the matrix board has been set, A is less than B, and the saw has not activated the right limit switch.

Pulses are produced on the LEFT DRIVE line in the same manner as with the right drive line, with the exception that a 0 on the $\overline{Q}$ output of start-up flip-flop 970 will also generate a series of LEFT DRIVE pulses. Whenever the zero push button 170 on the console 100 is activated, the start-up flip-flop 970 will be set, thereby placing a 1 at the output of NAND gate 948 to enable NAND gate 954 to transmit drive oscillator pulses to the output of NAND gate 956. The zero push button 170 on the console 100 is only connected to the saw 1 comparator board. Thus, when the zero push button 170 is activated, the start-up flip-flop 970 on the saw 1 comparator board is set, and LEFT DRIVE pulses will cause the saw 1 to move leftward. The closing of the left limit switch 1400 enables encode marker to trigger one shot 847. The pulse from the $\overline{Q}$ output of one shot 847 will reset the start-up flip-flop 970 on the comparator board for saw number 1, thereby making NEXT ZERO, the $\overline{Q}$ output of the start-up flip-flop 970, a 1. The NEXT ZERO output from the comparator board for saw number 1 is connected to the SAW ZERP input for the comparator board for saw number 2. Therefore, when saw number 1 has moved to its leftmost position, the start-up flip-flop 970 for comparator board number 2 is set, causing saw number 2 to move to its leftmost position. Each time a start-up flip-flop 970 is reset, the 1 to 0 at the Q output of start-up flip-flop 970 clears one shot 847 to return the $\overline{Q}$ output of one shot 847 to 1. The LAST ZERO output of the comparator board for saw number 5 is transmitted to the matrix board and received therein as LAST ZERO IN. LAST ZERO IN on the matrix board resets the zero flip-flop 562 and the move flip-flop 586. When the zero flip-flop 562 is reset, the zero lamp within push button 170 on the console 100 is extinguished.

Referring now to FIG. 7, the left drive pulses are inverted by NAND gate 1002 to place the flip-flop formed by NAND gates 1006 and 1008 in a condition whereby counterclockwise (CCW) will be 1. Similarly, right drive pulses are inverted by NAND gate 1004 to set the flip-flop composed of NAND gates 1006 and 1008 to a condition whereby clockwise (CW) will be 1.

The stepper motor drive pulses are produced by the drive pulse generator 1111. Each one of the LEFT SHIFT or RIGHT SHIFT pulses clocks the shift register 1110 through NAND gate 1112. Depending on the condition of the SO and S1 inputs to the shift register 1110, the signal present at the outputs of NAND gates 1114 or 1116 will be shifted either right or left. If CCW is 1, each clock pulse will shift the outputs $Q_A$ through $Q_D$ to the left one digit. The level appearing on the $Q_A$ output will be the level that was on the output of the NAND gate 1116 prior to the clock pulse. Similarly, if CW is 1, the data contained within shift register 1110 will be shifted to the right one unit for each clock pulse and the level at the output of $Q_A$ will be equal to the level at the output of NAND gate 1114 just prior to the clock pulse. In this manner, pulses will be generated in the sequence A, B, $\overline{A}$, $\overline{B}$ when CW is 1 and right drive pusles are being received by the stepper drive board, and pulses in the sequence $\overline{B}$, $\overline{A}$, B, A will be generated when CCW is 1 and left drive pulses are received by the stepper drive board.

The outputs from the drive pulse generator 1111 are amplified by the motor drive amplifier 1151, which is capable of providing sufficient current to drive the stepper motor. A 0 at the $Q_A$ output of the shift register 1110 causes current to flow through resistors 1124 and 1122. Current will then flow through the base of transistor 1126 and place the collector of transistor 1126 at 5 volts. Current amplifier 1130 then drives the MTR1 input to the stepper motor. The remaining inputs to the stepper motor are similarly driven in sequence.

It is to be understood that this invention is not limited to the precise structure disclosed but extends to all modifications apparent to one skilled in the art.

The embodiments of the invention in which a particular property or privilege is claimed are defined as follows:

1. A control system for positioning a plurality of saws, comprising:
   a mechanical control element for each saw;
   means for producing an electrical command signal for each control element, said command signal corresponding to a desired position of said mechanical control element;
   means for producing an electrical position signal for each mechanical control element, said position signal corresponding to the actual position of said mechanical control element;
   a comparator associated with each saw for generating an error signal corresponding to the difference in value between each command signal and its corresponding position signal;
   means for moving said mechanical control elements in one direction in response to an error signal having one polarity and in the opposite direction in response to an error signal having the opposite polarity;

a mechanical feedback element having a position determined by the absolute position of one saw, said saw constituting a reference saw;

a mechanical feedback element for each remaining saw, said mechanical feedback element having a position determined by the position of its corresponding saw relative to its adjacent saw intermediate said reference saw;

actuating means for positioning each saw responsive to the difference in position between its corresponding feedback and control elements; and calibrating means comprising means for moving each saw to a predetermined position and means for presetting said counter to a value corresponding to said predetermined position.

2. A control system for positioning a plurality of saws, comprising:

a mechanical control element for each saw;

means for producing an electrical command signal for each control element, said command signal corresponding to a desired position of said mechanical control element;

a comparator associated with each saw for generating an error signal corresponding to the difference in value between each command signal and its corresponding position signal;

means for moving said mechanical control elements in one direction in response to an error signal having one polarity and in the opposite direction in response to an error signal having the opposite polarity;

a mechanical feedback element having a position determined by the absolute position of one saw, said saw constituting a reference saw;

a mechanical feedback element for each remaining saw, said mechanical feedback element having a position determined by the position of its corresponding saw relative to its adjacent saw intermediate said reference saw;

actuating means for positioning each saw responsive to the difference in position between its corresponding feedback and control elements; and a control console having a first and second set of switches for each saw, each switch corresponding to a predetermined dimension, said means for producing an electrical command signal including means for adding the sum of the distances corresponding to a plurality of switches selected from said first set to the distance corresponding to one switch selected from said second set.

3. A control system as in claim 2 wherein said means for producing an electrical command signal comprise:

an input register for each of said first and second sets of switches wherein said input register sequentially interrogates each of said switches in its corresponding set;

a data register for sequentially interrogating each of said input registers and assigning a value to each actuated switch wherein, after each interrogation, said data register generates a pulse train having a quantity of pulses which is determined by the value assigned to said actuated switch; and a command register responsive to the pulses generated by said data register.

4. A control system as in claim 3 wherein said forward sequence of pulses and said reverse sequence of pulses occur at a reduced frequency when said error signal from said comparator has an absolute value below a predetermined level.

* * * * *